May 20, 1969  E. S. BUZZELLI  3,445,288
ALUMINUM ANODE ELECTRICAL ENERGY STORAGE DEVICE
Filed Jan. 3, 1966

INVENTOR
EDWARD S. BUZZELLI

BY Kramer & Sturgis

ATTORNEYS

United States Patent Office 3,445,288
Patented May 20, 1969

3,445,288
ALUMINUM ANODE ELECTRICAL ENERGY STORAGE DEVICE
Edward S. Buzzelli, Cleveland, Ohio, assignor to The Standard Oil Company, Cleveland, Ohio, a corporation of Ohio
Filed Jan. 3, 1966, Ser. No. 518,473
Int. Cl. H01m 43/00
U.S. Cl. 136—6       10 Claims

ABSTRACT OF THE DISCLOSURE

An electrical energy storage device is disclosed. It comprises a fused halide electrolyte, a negative electrode of aluminum or aluminum-lithium alloy, and an activated positive electrode.

---

This invention relates to an electrical energy storage device, and more particularly, to a chemical energy storage cell or battery of a metallic, negative electrode, most commonly a porous, carbon positive electrode and an alkali metal-halide electrolyte, wherein there is coaction between the electrodes and the electrolyte causing an electric potential to be produced between the electrodes externally of the cell. It is therefore to be understood that the term "cell" is meant in its broadest sense of two electrodes immersed in an electrolyte in a container.

Energy can be stored electrostatically, as in an electrical capacitor unit, or it can be stored chemically as in an electrical energy storage cell or battery. However, both of such means of energy storage are unfitted for continuous, commercial use involving a constant electrical energy drain in that the former, while permitting quick charge, also permits discharge in a relatively short period of time and low energy storage; and the latter, although much superior for the actual storage of electricity, because of high power delivery and slow discharge, suffers by lacking a quick charging means. It is therefore postulated that the ideal electrical energy storage cell combines the advantage of quick charge of the capacitor unit and the advantage of slow discharge of the battery. Consequently, research and development work, involving electrical energy storage devices, has proceeded along the lines of combining the advantages of both types of units into a single energy storage device. To accomplish this end, the invention hereindescribed contemplates construction of such a cell with a novel electrode composition.

Accordingly, it is an object of the present invention to produce an electrical energy storage device of quick charge and high power delivery.

This and other objects of the invention become more apparent to those skilled in the art from the following detailed description and drawings in which.

Figure 1:
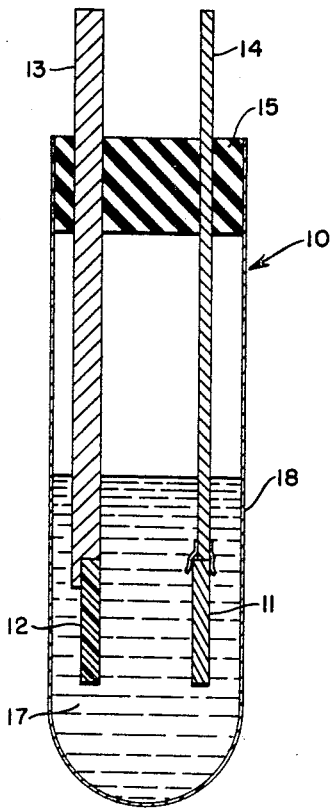
FIG. 1 is a perspective view of an electrical energy storage device.

According to the present invention, it has been discovered that high power delivery and rapid charge, and discharge above the range of a conventional lead-acid storage battery, can be obtained from an electrical energy storage cell comprising a pair of electrodes at least one of which is a negative electrode, comprising aluminum and lithium, the electrode being immersed or in contact with a fused alkali halide electrolyte, hereinafter described in more detail. The fast charging characteristics of the device are attributed, to a large measure, to the highly reversible aluminum-lithium electrode of the cell. The positive electrode, opposed to the aluminum-lithium negative electrode, can be carbon or any other suitable stable material.

The aluminum-lithium electrode can be produced by combining lithium with the aluminum by preparing a preformed alloy of aluminum and lithium, or, alternatively, electrochemically by charging a substantially pure aluminum electrode in an electrolyte, containing lithium ions to the extent of about one amp.-hr. per gram of aluminum, whereby lithium is diffused into the aluminum electrode structure.

The aluminum-lithium alloy of the electrode comprises aluminum in amounts of from about 70 to 95 weight percent, based on total composition, and from about 5 to 30 weight percent, based on total composition, lithium. Impurities such as, for example, copper, magnesium, manganese, indium and iron may be present in quantities less than 10 weight percent, based on total composition. An aluminum-lithium electrode of this range of composition operates at substantially constant voltage and exhibits high storage capabilities.

The aluminum-lithium electrode is capable of storing lithium metal of the electrolyte without forming an extensive liquid. Hence, the electrode remains solid, which solid electrode is capable of diffusing the lithium metal of the electrolyte through its structure. It has been found that on charge of the cell comprising the aluminum-lithium electrode, the electrode structure expands, wherein lithium metal of the electrolyte enters the electrode structure; on discharge, the lithium metal leaves the electrode structure. The electrode must, therefore, be able to withstand the stresses of expansion and contraction. For this reason, the aluminum-lithium metal electrode is preconditioned prior to use.

The electrode material is preconditioned by slow charge and discharge initially. This slow preconditioning results in an electrode of substantially uniform aluminum-lithium distribution and which electrode facilitates the takeup and release of the lithium metal upon the subsequent fast charge and discharge of a cell containing the electrode. If the initial charge and discharge cycles of the preconditioning are carried out too rapidly, local reigons of liquid metal alloy are built up, and the result is pitting of the aluminum-lithium electrode, which pitting has a deleterious effect when the electrodes are put into routine use. Evidence of such pitting is visible as lithium agglomeration. Aluminum-lithium electrodes cycled by slow charge and discharge show a fine, even distribution of the lithium metal in the aluminum.

Opposed to the aluminum-alkali metal electrode of this invention is a positive electrode comprising, as for example, carbon.

Generally speaking, the electrolyte used in the electric energy storage device herein described comprises a source of ions which are mobile, and most commonly, in the molten state at a temperature above about 250° C., and which electrolyte is derived from crystalline materials characterized by predominantly ionic lattice when in the crystalline state and can be disassociated to provide the requisite ion content and mobility in the molten state. When heated above their melting point, the crystalline compounds, or mixtures thereof, are considered as dissolved in each other, and each of the components of the crystalline material provides mobile ions. The mobile ions of the preferred embodiment of this invention are alkali and halide ions.

Typical examples of materials which can be used as electrolytes include salts of metals, and mixtures of such salts, and advantageously eutectic mixtures thereof, as for example binary systems of LiCl-KCl, LiBr-KBr, LiBr-NaBr, LiBr-LiF; and ternary systems, as for example, CaCl$_2$-LiCl-KCl, LiCl-KCl-NaCl; CaCl$_2$-LiCl-NaCl and LiF-NaF-RbF. A particularly useful electrolyte is a molten salt comprising lithium bromide and potassium bromide, or a molten salt comprising lithium chloride and potassium chloride having a composition of about 59 mole percent lithium chloride and 41 mole percent potassium chloride. This is a eutectic which melts at about 352° C.

Referring more particularly to the drawings, a schematic test cell 10 as envisioned by the present invention is shown in FIG. 1. Negative aluminum-lithium metal electrode 11 and opposed, porous carbon positive electrode 12 are positioned from one another in spaced relationship. Electrode 12 is fixed rigidly to a steel current carrier 14. Both of the electrodes, 11 and 12, are immersed in an electrolyte 17 held in a heat resistant glass container 18 which has been purged of atmospheric air and replaced by an inert gas. Electrode 11 is insulated electrically from electrode 12 by a cap 15 of an insulation material, as for example, lava and ceramic or any other non-conducting material, inserted in the top of the container surrounding the electrodes so as to maintain the insert atmosphere in the container.

In operation potassium chloride crystals and lithium chloride crystals were mixed in a proportion of 59 mole percent lithium chloride and 41 mole percent potassium chloride and dried at about 500° C. for two hours and dry charged to an electric storage cell container as illustrated in FIG. 1, containing an electrode of activated carbon and an opposed negative, aluminum-lithium alloy electrode of 18 weight percent lithium to a level about ½-inch above the electrodes. The two electrodes were connected through an external circuit. The electric storage cell was placed in an electric furnace at 500° C.

The cell was preconditioned in the furnace by charging the cell to 3.30 volts open-circuit and discharged to about 0.7 volt open-circuit and back to 3.30 volts open-circuit.

Figure 2:
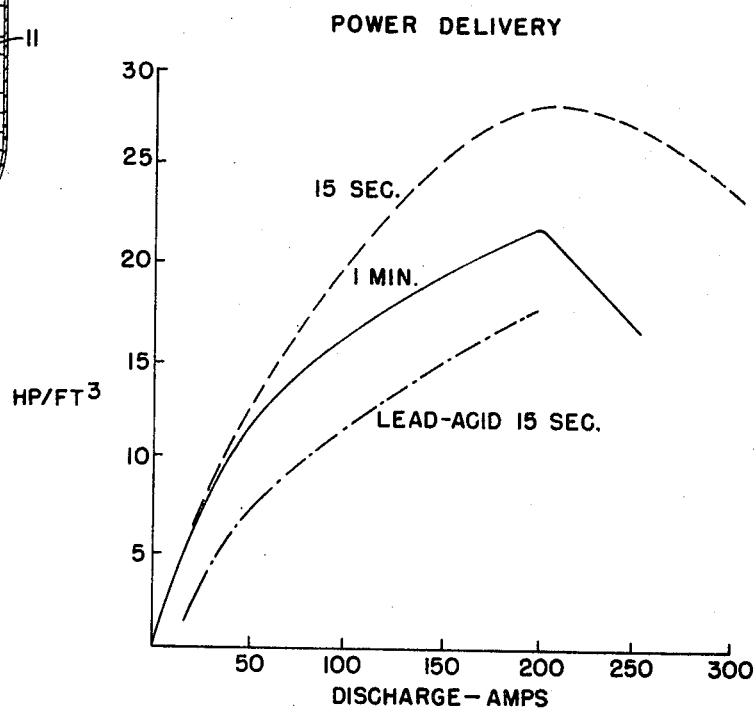
FIG. 2 is a comparative graph of power delivery of an electrical energy storage device of this invention and of a lead-acid electric energy storage device.

It has been found that a prototype of the device herein described, produces a current exceeding 495 ampere per sq. foot of carbon in the prototype, which current can be delivered at rates of 22.2 H.P. per cubic foot of prototype in one minute and 28.1 H.P. per cubic foot of prototype in 15 seconds.

type applied as a function of the discharge current is shown in FIG. 2 with data for a conventional lead-acid storage battery included for purposes of comparison. It is noteworthy that the curve for delivered horsepower at a discharge interval of one minute for this electrical storage device lies considerably above the curve for the delivered horsepower for the conventional lead-acid storage battery for a discharge interval of 15 seconds.

Since the electric energy storage device operates at or above the fusion temperature of the electrolyte, the above-mentioned electrolytes are provided a means of heating to insure their remaining in the molten state.

The electric energy storage units herein described lend themselves to connection with units of similar construction either by connection of a number of units in series and parallel, or by utilization of a stack of electrodes.

The emobdiments of the invention in which an exclusive property of privilege is claimed are defined as follows.

What is claimed is:

1. A secondary electrical energy storage device operable above the melting point of the electrolyte, comprising in combination:
  (a) positive and negative electrodes spaced from one another, the negative electrode consisting essentially of an alloy of 70 to 95 weight percent of aluminum and 30 to 5 weight percent of lithium, and
  (b) in contact with the electrodes, a molten electrolyte consisting essentially of one or more halides of an alkali metal or an alkaline earth metal or a combination thereof and containing lithium.

2. The storage device of claim 1 in which the other elctrode is essentially carbon.

3. The storage device of claim 1, the interior of which above the electrolyte is filled with an inert gas.

4. The storage device of claim 1 wherein the electrolyte of (b) is a mixture of alkali metal halides.

5. The storage device of claim 1 wherein the electrolyte of (b) is a mixture of lithium and potassium halides.

6. The storage device of claim 2 wherein the electrolyte is a mixture of alkali metal halides.

7. The storage device of claim 1 wherein the electrolyte of (b) is a mixture of lithium chloride and potassium chloride.

8. The storage device of claim 2 wherein the electrolyte is a mixture of lithium chloride and potassium chloride.

9. The storage device of claim 2 wherein the electrolyte is a eutectic mixture of lithium chloride and potassium chloride.

10. A method of storing electrical energy comprising the steps of:
  (a) providing an electrolyte of one or more halides of an alkali metal or an alkaline earth metal or a combination thereof and containing lithium, which electrolyte is solid at ambient temperatures,
  (b) heating the electrolyte to above its melting point,
  (c) immersing a pair of electrodes in the electrolyte to form an electrical energy storage cell one of the electrodes being essentially an aluminum-lithium alloy,
  (d) pre-conditioning the electrode, and
  (e) charging the cell electrically, the steps of immersing, pre-conditioning and charging being done while the electrolyte is at a temperature at or above its melting point.

References Cited

UNITED STATES PATENTS

| | | | |
|---|---|---|---|
| 732,631 | 6/1903 | Hambuechen | 317—233 |
| 939,183 | 11/1909 | Blackmore | 136—84 |
| 2,079,516 | 5/1937 | Lilienfeld | 317—230 |
| 2,937,219 | 5/1960 | Minnick et al. | 136—6 |
| 3,043,896 | 7/1962 | Herbert et al. | 136—6 |
| 3,055,960 | 9/1962 | Yalom et al. | 136—83 |
| 3,160,531 | 12/1964 | Spindler | 136—120 |
| 3,236,694 | 2/1966 | Stenger et al. | 136—83 |
| 3,343,948 | 9/1967 | Raclot | 75—138 |

A. B. CURTIS, *Primary Examiner.*

A. SKAPARS, *Assistant Examiner.*

U.S. Cl. X.R.
136—153, 176

UNITED STATES PATENT OFFICE
CERTIFICATE OF CORRECTION

Patent No. 3,445,288　　　　　　　　　　　　　　　　　　　　May 20, 1969

Edward S. Buzzelli

It is certified that error appears in the above identified patent and that said Letters Patent are hereby corrected as shown below:

Column 2, line 9, "ltihium" should read -- lithium --; line 41, "reigons" should read -- regions --. Column 3, line 42, before "type" insert -- The delivered horsepower per cubic foot of the proto- --; line 58, "emobdiments" should read -- embodiments --. Column 4, line 9, "elctrode" should read -- electrode --.

Signed and sealed this 14th day of April 1970.

(SEAL)
Attest:

Edward M. Fletcher, Jr.　　　　　　　　　　　WILLIAM E. SCHUYLER, JR.
Attesting Officer　　　　　　　　　　　　　　　　　Commissioner of Patents